US012676468B2

(12) United States Patent
Zhou et al.

(10) Patent No.: US 12,676,468 B2
(45) Date of Patent: Jul. 7, 2026

(54) SHUTDOWN DEVICE CONTROL METHOD AND APPARATUS, AND SHUTDOWN DEVICE

(71) Applicant: ALTENERGY POWER SYSTEM INC., Jiaxing (CN)

(72) Inventors: Dongming Zhou, Jiaxing (CN); Yuhao Luo, Jiaxing (CN); Xiao Lu, Jiaxing (CN); Fei Shen, Jiaxing (CN); Xuan Zhu, Jiaxing (CN)

(73) Assignee: ALTENERGY POWER SYSTEM INC., Jiaxing (CN)

( * ) Notice: Subject to any disclaimer, the term of this patent is extended or adjusted under 35 U.S.C. 154(b) by 269 days.

(21) Appl. No.: 18/568,821

(22) PCT Filed: Jul. 8, 2021

(86) PCT No.: PCT/CN2021/105164
§ 371 (c)(1),
(2) Date: Dec. 10, 2023

(87) PCT Pub. No.: WO2022/257215
PCT Pub. Date: Dec. 15, 2022

(65) Prior Publication Data
US 2024/0275159 A1 Aug. 15, 2024

(30) Foreign Application Priority Data

Jun. 11, 2021 (CN) .......................... 202110655815.3

(51) Int. Cl.
*H02H 3/00* (2006.01)
*G06F 1/30* (2006.01)
(Continued)

(52) U.S. Cl.
CPC ................. *H02H 3/08* (2013.01); *G06F 1/30* (2013.01); *H02H 1/0007* (2013.01)

(58) Field of Classification Search
CPC .......... H02H 3/08; H02H 1/0007; H02H 7/20; G06F 1/30
(Continued)

(56) References Cited

U.S. PATENT DOCUMENTS 11,955,957 B2 * 4/2024 Djelassi-Tscheck ........................
H03K 17/0822
2013/0200710 A1 8/2013 Robbins
(Continued)

FOREIGN PATENT DOCUMENTS

CN 107565600 A 1/2018
CN 207543025 U 6/2018
(Continued)

OTHER PUBLICATIONS

International Search Report for PCT/CN2021/105164 mailed Mar. 9, 2022, ISA/CN.
(Continued)

*Primary Examiner* — Crystal L Hammond
*Assistant Examiner* — Lucy M Thomas
(74) *Attorney, Agent, or Firm* — Yue (Robert) Xu; Apex Attorneys at Law, LLP

(57) ABSTRACT

A method and an apparatus for controlling a shutoff device, and a shutoff device. The shutoff device includes N main switching transistors and N bypass switching transistors. The method includes: controlling the N main switching transistors to be turned on after receiving a heartbeat signal; determining whether a power supply voltage of a processor is less than a first under-voltage protection voltage; and if so, controlling the N main switching transistors to be turned off, and controlling the N bypass switching transistors to be turned on. Thus, N photovoltaic modules and N main switching transistors corresponding to a shutoff device are separated from multiple photovoltaic module groups, so that
(Continued)

the photovoltaic module groups corresponding to other shutoff devices can normally output DC voltage to an inverter, and the inverter can normally output AC power for integration into a power grid, thereby ensuring the normal operation of the photovoltaic system.

10 Claims, 8 Drawing Sheets

(51) Int. Cl.
H02H 1/00 (2006.01)
H02H 3/08 (2006.01)

(58) Field of Classification Search
USPC .......................................................... 361/87
See application file for complete search history.

(56) References Cited

U.S. PATENT DOCUMENTS

| | | | |
|---|---|---|---|
| 2014/0306542 A1 | 10/2014 | Williams | |
| 2019/0013420 A1 | 1/2019 | Nesemann et al. | |
| 2020/0091706 A1* | 3/2020 | Yang | H02S 40/36 |
| 2020/0185923 A1 | 6/2020 | Yang et al. | |
| 2021/0351592 A1 | 11/2021 | Gu et al. | |
| 2022/0294389 A1* | 9/2022 | Luo | H02S 40/34 |
| 2023/0126969 A1* | 4/2023 | Yang | H02S 50/00 |
| | | | 361/88 |

FOREIGN PATENT DOCUMENTS

| | | | |
|---|---|---|---|
| CN | 108781055 | A | 11/2018 |
| CN | 208257762 | U | 12/2018 |
| CN | 109474020 | A | 3/2019 |
| CN | 109818567 | A | 5/2019 |
| CN | 111934352 | A | 11/2020 |
| CN | 112751354 | A | 5/2021 |
| CN | 113489052 | A | 10/2021 |
| CN | 112868153 | B | 12/2022 |

OTHER PUBLICATIONS

Chinese first Office Action issued on Apr. 1, 2025 for the Chinese priority application No. 202110655815.3.

* cited by examiner

Control N main switching transistors to be turned on after receiving a heartbeat signal    S11

Determine whether a power supply voltage of the processor is less than a first under-voltage protection voltage    S12

Yes

Control the N main switching transistors to be turned off, and control N bypass switching transistors to be turned on    S13

1

SHUTDOWN DEVICE CONTROL METHOD AND APPARATUS, AND SHUTDOWN DEVICE

CROSS REFERENCE OF RELATED APPLICATION

The present application is the national phase of International Application No. PCT/CN2021/105164, titled "SHUTDOWN DEVICE CONTROL METHOD AND APPARATUS, AND SHUTDOWN DEVICE", filed on Jul. 8, 2021, which claims priority to Chinese Patent Application No. 202110655815.3, titled "SHUTDOWN DEVICE CONTROL METHOD AND APPARATUS, AND SHUTDOWN DEVICE", filed on Jun. 11, 2021 with the China National Intellectual Property Administration, both of which are incorporated herein by reference in their entireties.

FIELD

The present disclosure relates to the field of security protection for photovoltaic power generation systems, and in particular to a method and an apparatus for controlling a shutoff device, and a shutoff device.

BACKGROUND

Due to reproducibility and cleanliness of solar energy, a technology of grid-connected photovoltaic power generation has been rapidly developed. In general, a photovoltaic system includes multiple photovoltaic module groups connected in series, and the photovoltaic module groups connected in series are connected to an inverter through a direct current cable, to enable the inverter to convert a direct current high voltage output from the multiple photovoltaic module groups into an alternating current high voltage for integration into a power grid. Each photovoltaic module group includes N photovoltaic modules, N is a positive integer, and N photovoltaic modules are connected in series with each other.

In conventional technology, in order to ensure security of power supply of the photovoltaic system, an arc protection function is generally provided in the inverter. Specifically, the inverter is controlled to stop operating when an arc is detected. However, a direct current cable connected to an output terminal of multiple photovoltaic module groups still output a direct current high voltage, which may cause personal danger or fire accident.

In order to solve the above technical problems, in conventional technology, a shutoff device is further provided at an output terminal of each photovoltaic module group, and output terminals of the shutoff devices are connected to the inverter after being connected in series. When an arc occurs, the shutoff devices are controlled to be turned off to reduce the direct current voltage on the direct cable, thereby avoiding personal danger and fire accident. However, due to the series connection between multiple shutoff devices, when one of the shutoff devices does not operate normally, each photovoltaic module group cannot output a direct current power to the direct current cable, thereby causing the inverter being unable to integrate an alternating current power into the power grid, and resulting in abnormal operation of the photovoltaic system.

SUMMARY

The purpose of the present disclosure is to provide a method and an apparatus for controlling a shutoff device, and a shutoff device. When a power supply voltage of a processor of the shutoff device is less than a first under-voltage protection voltage of the processor, N bypass switching transistors are controlled to be turned on, and N main switching transistors are controlled to be turned off. Thus, N photovoltaic modules and N main switching transistors corresponding to the shutoff device are separated from multiple series connected photovoltaic module groups which are connected to an inverter, so that the photovoltaic module groups corresponding to other shutoff devices can normally output direct current voltage to the inverter, and the inverter can normally output alternating current power for integration into a power grid, thereby ensuring the normal operation of the photovoltaic system and improving the reliability of the photovoltaic system.

In order to solve the technical problems above, a method for controlling a shutoff device is provided in the present disclosure. The method is applied to a processor of the shutoff device. The shutoff device includes N main switching transistors corresponding to N photovoltaic modules one by one and N bypass switching transistors corresponding to the N photovoltaic modules one by one.

A positive terminal of a power supply of the processor is connected to an output positive terminal of a first photovoltaic module, a negative terminal of the power supply of the processor is connected to an output negative terminal of an i-th photovoltaic module, a first terminal of a first main switching transistor is an output positive terminal of the shutoff device, a second terminal of an i-th main switching transistor is connected to an output positive terminal of the i-th photovoltaic module, a first terminal of an (i+1)-th main switching transistor is connected to an output negative terminal of the i-th photovoltaic module, an output negative terminal of a N-th photovoltaic module is an output negative terminal of the shutoff device, a first terminal of each bypass switching transistor is connected to a first terminal of a corresponding main switching transistor, a second terminal of said bypass switching transistor is connected to an output negative terminal of the corresponding photovoltaic module, where $N \geq i \geq 1$, and N and i are both integers.

The method includes:

controlling the N main switching transistors to be turned on after receiving a heartbeat signal;

determining whether a power supply voltage of the processor is less than a first under-voltage protection voltage; and when determining that the power supply voltage of the processor is less than the first under-voltage protection voltage, controlling the N main switching transistors to be turned off, and controlling the N bypass switching transistors to be turned on.

In an embodiment, before the determining whether a power supply voltage of the processor is less than a first under-voltage protection voltage, the method further includes:

determining whether the power supply voltage of the processor is less than a second under-voltage protection voltage, the second under-voltage protection voltage being less than the first under-voltage protection voltage;

when determining that the power supply voltage is not less than the second under-voltage protection voltage, proceeding to the step of determining whether the power supply voltage of the processor is less than the first under-voltage protection voltage; and when determining that the power supply voltage is less than the second under-voltage protection voltage, controlling the processor to be powered off, controlling the processor to be powered on after receiving a power on command, and proceeding to the step of determining whether the power supply voltage of the processor is less than the second under-voltage protection voltage.

In an embodiment, the bypass switching transistor is a Metal-Oxide-Semiconductor Field-Effect Transistor, MOS-FET, and the MOSFET includes a body diode;

where after the controlling the N main switching transistors to be turned off, the method further includes:

obtaining a bypass current through said bypass switching transistor;

determining whether the bypass current is greater than a preset current; and when determining that the bypass current is greater than the preset current, controlling the N bypass switching transistors to be turned on.

In an embodiment, the determining whether the bypass current is greater than the preset current includes:

determining whether the bypass current is continuously greater than the preset current during a first preset period; and when determining that the bypass current is continuously greater than the preset current during the first preset period, proceeding to the step of controlling the N bypass switching transistors to be turned on.

In an embodiment, after the controlling the N main switching transistors to be turned off and controlling the N bypass switching transistors to be turned on, the method further includes:

determining whether a turning-on period of the N bypass switching transistors reaches a second preset period; and when determining that the turning-on period of the N bypass switching transistors reaches the second preset period, controlling the N bypass switching transistors to be turned off, and proceeding to the step of controlling the N main switching transistors to be turned on.

In an embodiment, the controlling the N main switching transistors to be turned on includes:

controlling the N main switching transistors to be turned on by staggering peaks; and where the controlling the N bypass switching transistors to be turned off includes:

controlling an order of controlling the N bypass switching transistors to be turned off to be the same as an order of controlling the corresponding N main switching transistors to be turned on by staggering peaks.

In an embodiment, after the determining whether a power supply voltage of the processor is less than a first under-voltage protection voltage, the method further includes:

when determining that the power supply voltage of the processor is not less than the first under-voltage protection voltage, obtaining operation information of the N photovoltaic modules;

based on the operation information, determining whether there is a photovoltaic module with abnormal operation in the N photovoltaic modules; and when determining that there is the photovoltaic module with abnormal operation, controlling a main switching transistor corresponding to the photovoltaic module with abnormal operation to be turned off, and controlling a bypass switching transistor corresponding to the photovoltaic module with abnormal operation to be turned on.

In order to solve the technical problems above, an apparatus for controlling a shutoff device is further provided in the present disclosure. The apparatus includes:

a memory, configured to storage computer program;

a processor, configured to implement any one of the above methods for controlling the shutoff device when executes the computer program.

In order to solve the technical problems above, a shutoff device is further provided in the present disclosure. The shutoff device includes the apparatus for controlling the shutoff device described above, N main switching transistors corresponding to N photovoltaic modules one by one and N bypass switching transistors corresponding to the N photovoltaic modules one by one.

A positive terminal of a power supply of the processor is connected to an output positive terminal of a first photovoltaic module, a negative terminal of the power supply of the processor is connected to an output negative terminal of an i-th photovoltaic module, a first terminal of a first main switching transistor is an output positive terminal of the shutoff device, a second terminal of an i-th main switching transistor is connected to an output positive terminal of the i-th photovoltaic module, a first terminal of an (i+1)-th main switching transistor is connected to an output negative terminal of the i-th photovoltaic module, an output negative terminal of a N-th photovoltaic module is an output negative terminal of the shutoff device, a first terminal of each bypass switching transistor is connected to a first terminal of a corresponding main switching transistor, a second terminal of said bypass switching transistor is connected to an output negative terminal of the corresponding photovoltaic module, where N≥i≥1, and N and i are both integers.

In an embodiment, the shutoff device further includes a diode, a first capacitor, a second capacitor.

An anode of the diode is connected to the output positive terminal of the first photovoltaic module, a cathode of the diode is connected to a first terminal of the first capacitor and the positive terminal of the power supply of the processor respectively, a second terminal of the first capacitor is connected to an output negative terminal of the first photovoltaic module and a first terminal of the second capacitor respectively, the first terminal of the second capacitor is respectively connected to the output terminal of the power supply of the processor and a terminal of a power supply of an electrical apparatus in the shutoff device.

The processor is further configured to convert a voltage of the positive terminal of the power supply of the processor to supply power to the electrical apparatus in the shutoff device.

A method and an apparatus for controlling a shutoff device, and a shutoff device are provided in the present disclosure. After a heartbeat signal is received, N main switching transistors are turned on, so that N photovoltaic modules can output direct current through N corresponding main switching transistors. When the N main switching transistors are turned on and the power supply voltage of the processor is abnormal, that is, when the power supply voltage of the processor of the shutoff device is less than a first under-voltage protection voltage of the processor, N bypass switching transistors are controlled to be turned on, and N main switching transistors are controlled to be turned off. Thus, N photovoltaic modules and N main switching transistors corresponding to the shutoff device are separated from multiple series connected photovoltaic module groups which are connected to an inverter, so that the photovoltaic module groups corresponding to other shutoff devices can normally output direct current voltage to the inverter, and the inverter can normally output alternating current power for integration into a power grid, thereby ensuring the normal operation of the photovoltaic system and improving the reliability of the photovoltaic system.

BRIEF DESCRIPTION OF THE DRAWINGS

In order to illustrate technical solutions in embodiments of the present disclosure more clearly, drawings to be used in the description of the conventional technology or the embodiments are introduced simply hereinafter. It is apparent that the drawings described below show only some embodiments of the present disclosure, and other drawings may be obtained by those skilled in the art based on the provided drawings without any creative effort.

DETAILED DESCRIPTION OF THE EMBODIMENTS

The core of the present disclosure is to provide a method and an apparatus for controlling a shutoff device, and a shutoff device. When a power supply voltage of a processor of the shutoff device is less than a first under-voltage protection voltage of the processor, N bypass switching transistors are controlled to be turned on, and N main switching transistors are controlled to be turned off. Thus, N photovoltaic modules and N main switching transistors corresponding to the shutoff device are separated from multiple series connected photovoltaic module groups which are connected to an inverter, so that the photovoltaic module groups corresponding to other shutoff devices can normally output direct current voltage to the inverter, and the inverter can normally output alternating current power for integration into a power grid, thereby ensuring the normal operation of the photovoltaic system and improving the reliability of the photovoltaic system.

In order to clarify the purpose, technical solutions and advantages of the embodiments of the present disclosure, the technical solutions in the embodiments of the present disclosure are described clearly and completely hereinafter in conjunction with the drawings in the embodiments of the present disclosure. Apparently, the described embodiments are only a part of the embodiments of the present disclosure, rather than all embodiments. Any other embodiments obtained by those skilled in the art based on the embodiments in the present disclosure without any creative effort shall fall within the protection scope of the present disclosure.

Figure 1:
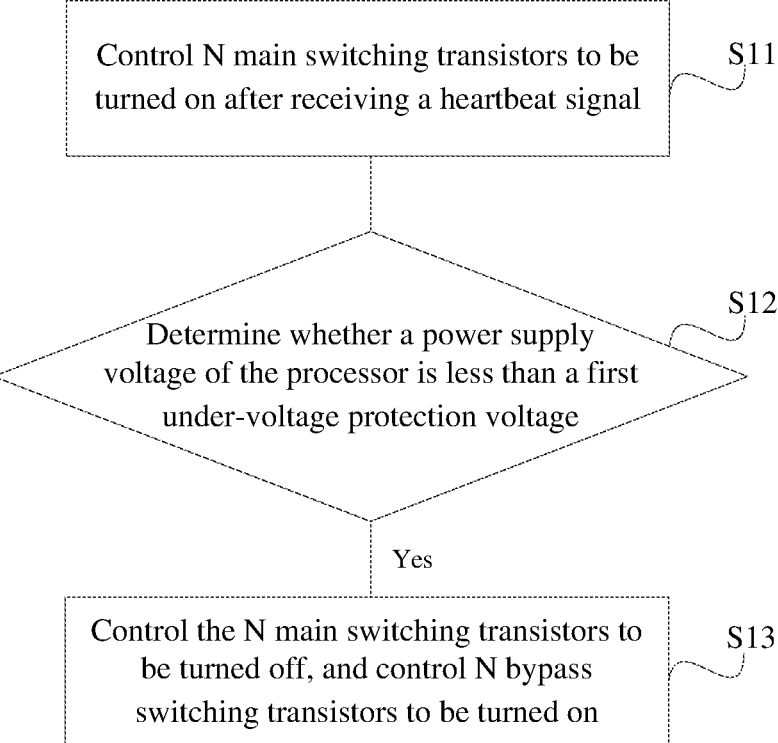
FIG. 1 is a flowchart of a method for controlling a shutoff device according to an embodiment of the present disclosure.

Reference is made to FIG. 1, which shows a flowchart of a method for controlling a shutoff device according to an embodiment of the present disclosure. The method is applied to a processor of the shutoff device. The shutoff device includes N main switching transistors corresponding to N photovoltaic modules one by one and N bypass switching transistors corresponding to the N photovoltaic modules one by one.

A positive terminal of a power supply of the processor is connected to an output positive terminal of a first photovoltaic module, a negative terminal of the power supply of the processor is connected to an output negative terminal of an i-th photovoltaic module, a first terminal of a first main switching transistor is an output positive terminal of the shutoff device, a second terminal of an i-th main switching transistor is connected to an output positive terminal of the i-th photovoltaic module, a first terminal of an (i+1)-th main switching transistor is connected to an output negative terminal of the i-th photovoltaic module, an output negative terminal of a N-th photovoltaic module is an output negative terminal of the shutoff device, a first terminal of each bypass switching transistor is connected to a first terminal of a corresponding main switching transistor, a second terminal of said bypass switching transistor is connected to an output negative terminal of the corresponding photovoltaic module, where $N \geq i \geq 1$, and N and i are both integers.

The method includes:

S11, controlling the N main switching transistors to be turned on after receiving a heartbeat signal;

S12, determining whether a power supply voltage of the processor is less than a first under-voltage protection voltage; and S13, if so, controlling the N main switching transistors to be turned off, and controlling the N bypass switching transistors to be turned on.

Considering that multiple photovoltaic modules are connected in series through the shutoff device to output direct current power, which is then converted into alternating current power by the inverter and integrated into the grid, the stable operation of the shutoff device plays a crucial role in the stable operation of the entire photovoltaic system. Specifically, if one of the shutoff devices fails, all photovoltaic modules are unable to output direct current power to the direct current cable, and the entire photovoltaic system is unable to integrate alternating current power into the grid.

In order to solve the technical problems above, the design concept of the present disclosure is to: provide a method for controlling the shutoff device to ensure a normal and stable operation of the shutoff device; or, isolate the faulty shutoff device from multiple series connected photovoltaic module groups, so that other photovoltaic module groups can output direct current power to the direct current cable through the corresponding shutoff device, and the inverter can still convert the direct current power on the direct current cable into alternating current power for integration into the grid, thus achieving the normal operation of the photovoltaic system.

Based on the above, a method for controlling the shutoff device is provided in the present disclosure. The method is used to controlling the operation of the shutoff device according to the power supply voltage of the processor to implement the normal operation of the photovoltaic system. Specifically, the power supply voltage of the processor is the direct current power output from multiple photovoltaic modules in the corresponding photovoltaic module group. When the heartbeat signal sent by a system controller is received, N corresponding main switching transistors are turned on. In this case, the direct current output from multiple photovoltaic modules not only supplies power to the processor, but also outputs direct current to the direct current cable through the corresponding main switching transistor. The turning on of N main switching transistors may reduce the power supply voltage of the processor, which may reach the first under-voltage protection voltage of the processor, causing abnormal operation of the processor and potentially leading to unreliable control of the shutoff device. Therefore, in the present disclosure, when the power supply voltage of the processor is less than the first under-voltage protection voltage of the processor, N main switching transistors are controlled to be turned off, and N bypass switching transistors are controlled to be turned on. Thus, N bypass switching transistors separate the photovoltaic module group composed of N photovoltaic modules from multiple series connected photovoltaic module groups, so that other photovoltaic module groups can normally output direct current to the direct current cable to ensure the normal operation of the photovoltaic system.

It should be noted that in the present disclosure, the first under-voltage protection voltage is a protection voltage used to ensure a normal operation of the processor. The purpose of controlling the N main switching transistors to be turned off is to increase the power supply voltage of the processor, so that the processor can operate normally.

Figure 2:
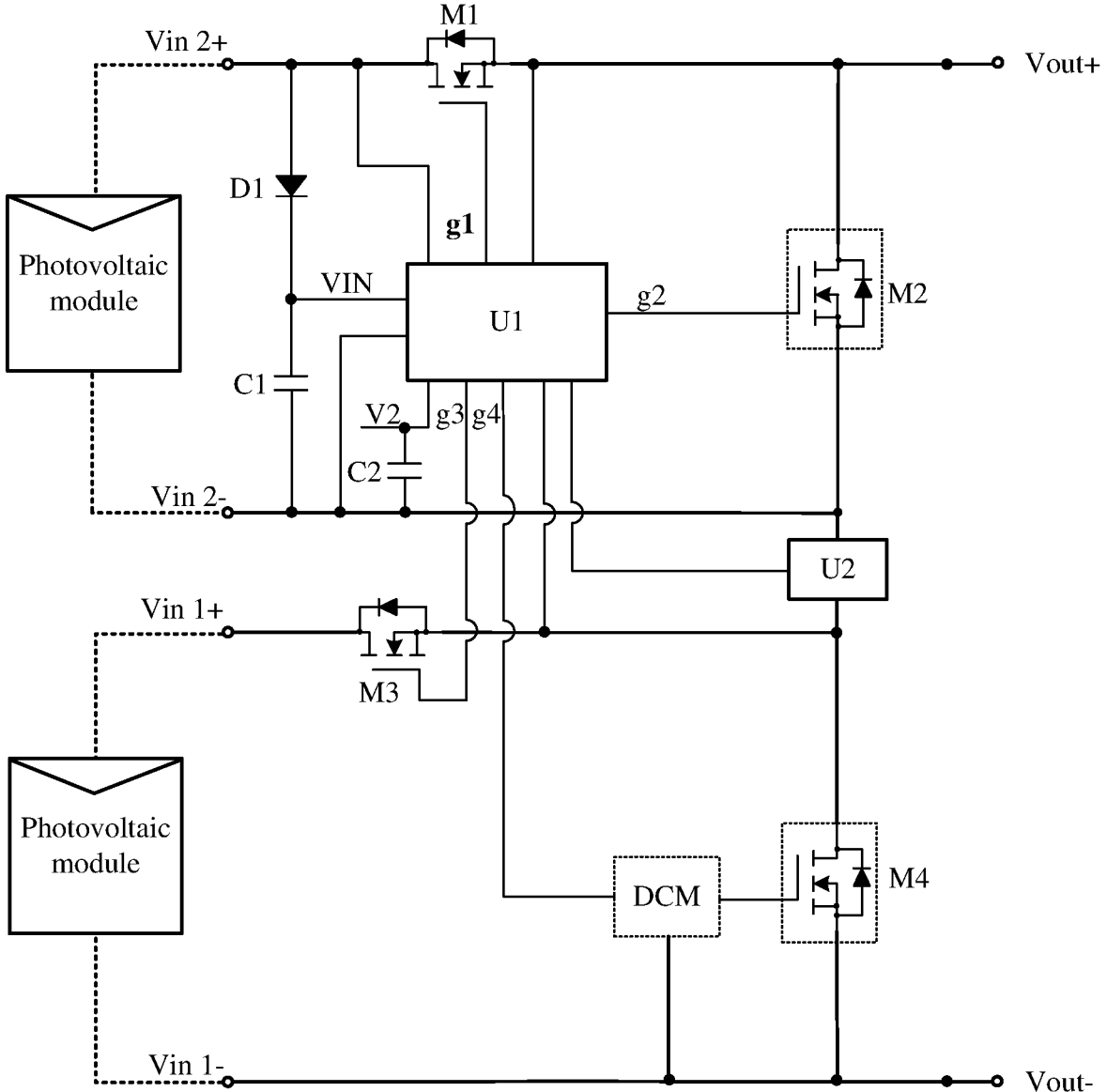
FIG. 2 is a specific implementation circuit diagram of a shutoff device according to an embodiment of the present disclosure.
Figure 3:
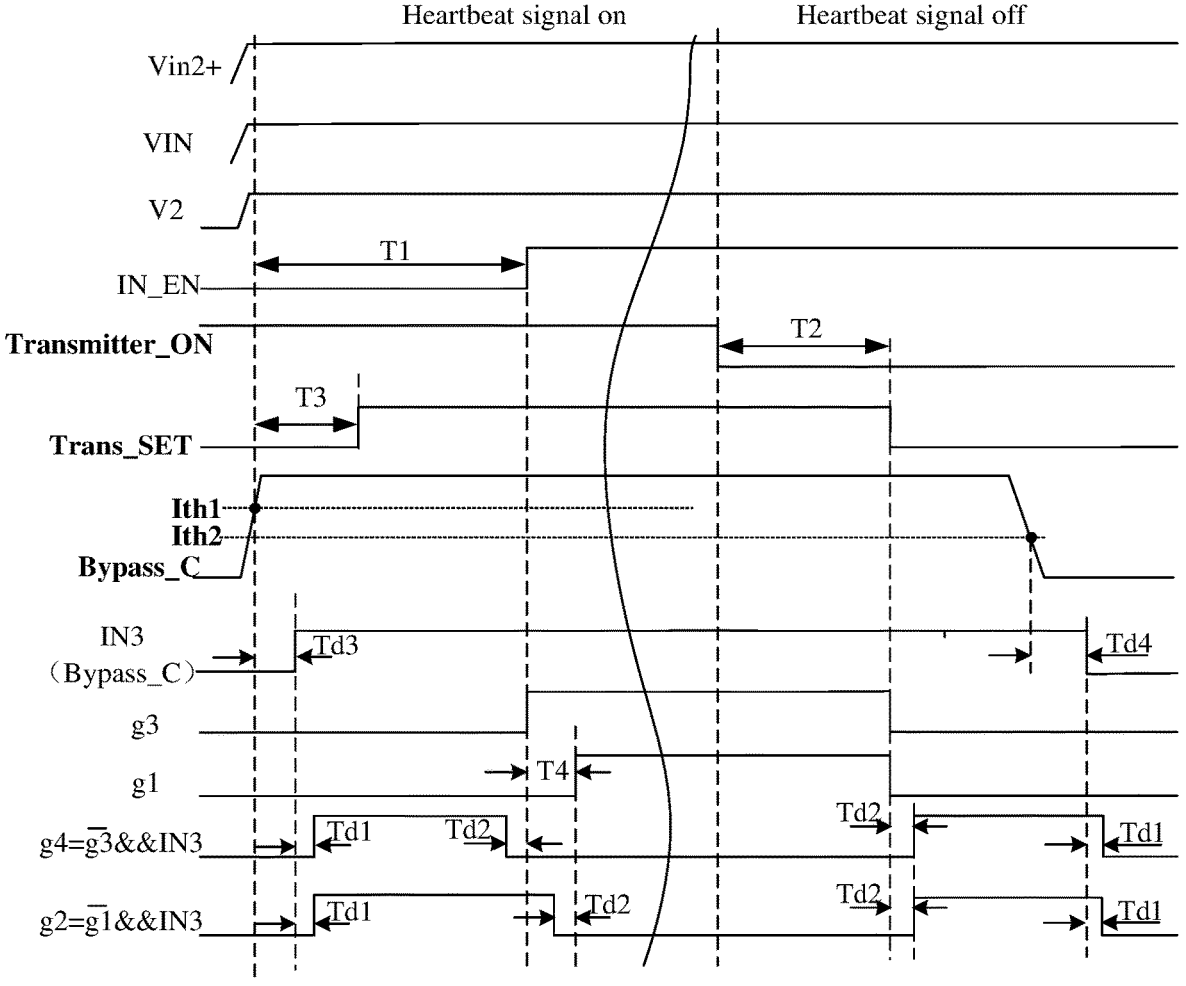
FIG. 3 is a control timing diagram of a first shutoff device according to an embodiment of the present disclosure.

Reference is made to FIG. 2 and FIG. 3, FIG. 2 is a specific implementation circuit diagram of a shutoff device according to an embodiment of the present disclosure, and FIG. 3 is a control timing diagram of a first shutoff device according to an embodiment of the present disclosure.

In this embodiment, the shutoff device further includes a diode D1, a first capacitor C1, and a second capacitor C2.

An anode of the diode D1 is connected to the output positive terminal of the first photovoltaic module, a cathode of the diode D1 is connected to a first terminal of the first capacitor C1 and the positive terminal of the power supply of the processor respectively, a second terminal of the first capacitor C1 is connected to an output negative terminal of the first photovoltaic module and a first terminal of the second capacitor C2 respectively, a second terminal of the second capacitor C2 is connected to the output terminal of the power supply of the processor and a terminal of a power supply of an electrical apparatus in the shutoff device respectively.

The processor further configured to convert a voltage of the positive terminal of the power supply of the processor to supply power to the electrical apparatus in the shutoff device.

Specifically, the output voltage of the photovoltaic module charges the first capacitor C1 through the diode D1, and the voltage of the first capacitor C1 is the power supply voltage of the processor. Similarly, the power supply at the output terminal of the power supply of the processor supplies power to the second capacitor C2, and the first terminal voltage of the second capacitor C2 may supply power to other electrical apparatus.

In addition, when the photovoltaic module does not output voltage, due to the energy storage capacity of the capacitor itself, even if the photovoltaic module does not output voltage, the first capacitor C1 can still supply power to the processor for a period of time, to prevent the processor from being powered off. Similarly, the second capacitor C2 can also ensure that the powered electrical equipment operates normally for a period of time.

In general, the processor is configured to buck its power supply voltage to supply power to low-voltage devices. Therefore, the corresponding capacitor C1 is a capacitor with a large capacitance, a relatively large packaging volume and a high cost. For example, the first terminal voltage of the first capacitor C1 is about one hundred volts. A capacitance, a corresponding packaging volume and a cost of the second capacitor C2 are relatively small. For example, the first terminal voltage of the second capacitor C2 is about 20 volts. When the photovoltaic module does not output voltage, the power supply of the second capacitor C2 mainly comes from the first capacitor C1, which means that the capacitance stored in the first capacitor C1 not only supplies power to the processor, but also supplies power to the electrical apparatus connected to the output terminal of the power supply of the processor. Accordingly, the capacitance of the second capacitor C2 can be adaptively increased (such as, increasing the the first terminal voltage of the second capacitor C2 to 25 volts), and the capacitance of the first capacitor C1 can be adaptively reduced (such as, reducing the first terminal voltage of the first capacitor C1 to 80 volts). In this way, the second capacitor C2 stores more energy and takes less energy from the first capacitor C1, thus, the capacitance of the first capacitor C1 can be set smaller, which can greatly reduce the packaging volume and cost of the first capacitor C1 and the second capacitor C2.

In addition, based on the above embodiments, the processor in the present disclosure may be one processor or include two separate processors. For example, the processor includes a first processor and a second processor, and a number of the photovoltaic modules corresponding to the shutoff device is two (in order to describe the present disclosure conveniently, the following embodiments are illustrated with the number of the photovoltaic modules, main switching transistors, bypass switching transistors as two). As shown in FIG. 2 and FIG. 3, Vin2+ is the output voltage of the first photovoltaic module, and VIN is the power supply voltage of the processor. Specifically, VIN is the power supply voltage of the first processor, that is, the first terminal voltage of the first capacitor C1. V2 is the output power supply voltage of the processor. Specifically, V2 is the power supply voltage of the second processor, that is, the first terminal voltage of the second capacitor C2. IN_EN is the internal logic signal, Transmitter_ON is the heartbeat signal, and Trans_SET is the start signal sent from the second processor to the first processor after receiving the heart beat signal. Correspondingly, the first processor is specifically configured to: control the N main switching transistors to be turned on after the start signal is received; and control the N main switching transistors to be turned off and control the N bypass switching transistors to be turned on when no start signal is received.

In summary, in the present disclosure, after the N main switching transistors are turned on, when the power supply voltage of the processor is abnormal, that is, when the power supply voltage of the processor of the shutoff device is less than the first under-voltage protection voltage of the processor, the N bypass switching transistors are controlled to be turned on, and the N main switching transistors are controlled to be turned off. Thus, N photovoltaic modules and N main switching transistors corresponding to the shutoff device are separated from multiple series connected photovoltaic module groups which are connected to an inverter, so that the photovoltaic module groups corresponding to other shutoff devices can normally output direct current voltage to the inverter, and the inverter can normally output alternating current power for integration into a power grid, thereby ensuring the normal operation of the photovoltaic system and improving the reliability of the photovoltaic system.

Based on the above embodiments above, in an embodiment, the bypass switching transistor is a MOSFET (Metal-Oxide-Semiconductor Field-Effect Transistor), and the MOSFET includes a body diode D1.

After controlling the N main switching transistors to be turned off, the method further includes:

obtaining a bypass current through said bypass switching transistor;

obtaining whether the bypass current is greater than a preset current; and if so, controlling the N bypass switching transistors to be turned on.

Specifically, the bypass switching transistors in this embodiment may be, but is not limited to the MOSFET. When the bypass switching transistors is the MOSFET, since the MOSFET includes the body diode D1, bypass current will pass through the body diode D1 in the MOSFET after the main switching transistor is turned off. However, the too large bypass current may result in a serious heating up of the body diode D1, then the MOSFET may be damaged.

In order to solve technical problems above, in the present disclosure, when the bypass current is greater than the preset current, the bypass switching transistor is controlled to be turned on, to avoid serious heating up of the MOSFET and ensure security of the system.

In an embodiment, the determining whether the bypass current is greater than the preset current includes:

determining whether the bypass current is continuously greater than the preset current during a first preset period; and if the bypass current is continuously greater than the preset current during the first preset period, entering the step of controlling N bypass switching transistors to be turned on.

The setting of the first preset period in the method for controlling the shutoff device in the present disclosure is to ensure the stability of determining whether the bypass current is greater than the preset current. That is, only if the bypass current is stably greater than the preset current during the first preset period, the N bypass switching transistors are controlled to be turned on.

Specifically, there may be interference or other factors that cause the bypass current to only exceed the present current for short period of time. If the N bypass switching transistors are directly controlled to operate when the bypass current exceeds the preset current, it may cause misoperation or frequent operation of the bypass switching transistors, which may lead to damage to the shutoff device.

Therefore, the first preset period is set in the present disclosure to ensure the stability of the determination for the bypass current, to ensure the reliability of the system operation and to avoid the damage to the switching transistors in the system.

In embodiment, after the controlling the N main switching transistors to be turned off and controlling the N bypass switching transistors to be turned on, the method further includes:

determining whether a turning-on period of the N bypass switching transistors reaches a second preset period; and if so, controlling the N bypass switching transistors to be turned off, and entering the step of controlling the N main switching transistors to be turned on.

After the controlling bypass switching transistors to be turned on, in order to raise the power supply of the processor to a voltage that can enable the processor to operate normally, and to determine whether the power supply voltage of the processor is recovered to the power supply voltage for normal operation, the method of this embodiment includes: after entering a bypass mode (when the N bypass switching transistors are turned on and the N main switching transistors are turned off) for the second preset period, exiting the bypass mode, controlling the main switching transistors to be turned on, and controlling the bypass switching transistors to be turned off. If the processor power supply voltage is normal at this time, the whole shutoff device enters a normal operation mode. Otherwise, the shutoff device enters the bypass mode again. That is, whether to control the shutoff device to exit the bypass mode is determined by an intermittent mode in this embodiment.

In an embodiment, the controlling N main switching transistors to be turned on includes:

controlling the N main switching transistors to be turned on by staggering peaks; and where the controlling the N bypass switching transistors to be turned off includes:

controlling an order of controlling the N bypass switching transistors to be turned off to be the same as an order of controlling the corresponding N main switching transistors to be turned on by staggering peaks.

Specifically, the photovoltaic system may be damaged by the direct pass-through phenomenon. When N main switching transistors are turned on simultaneously, voltage on a bus and current on each main switching transistor will suddenly increase. In this case, it may cause damage to the photovoltaic system due to voltage mutations or current mutations.

In order to solve technical problems above, in the present disclosure, when N main switching transistors are controlled to be turned on, the N main switching transistors are controlled to be turned on by staggering peaks, to enable the voltage or current to increase gradually, thereby avoiding the damage to the photovoltaic system. The time when N main switching transistors are turned on by staggering peaks is not limited in the present disclosure. The N bypass switching transistors are correspondingly controlled to be turned off by staggering peaks.

Specifically, when N is two, one shutoff device corresponds to two photovoltaic modules, two main switching transistors and two bypass switching transistors. In an embodiment of the present disclosure, the main switching transistors and bypass switching transistors are NMOS transistors, as shown in FIG. 2 and FIG. 3. In FIG. 3, Bypass_C is the bypass current, Ith_1 is the preset current, IN3 is the internal logic signal, and g1, g2, g3 and g4 are control signals of M1, M2, M3 and M4 respectively, where M1, M2, M3 and M4 are turned on when the control signals are in high level. It can be seen from FIG. 3, when the bypass current is greater than the preset current (a first preset period, Td3), IN3 is in high level. If the corresponding main switching transistor is turned off, the corresponding bypass switching transistor is turned on. Specifically, the power level of g4 is determined by the logic of IN3 and g3, and the power level of g2 is determined by the logic of IN3 and g1. Furthermore, it can be seen from FIG. 6 that, M3 is turned on (staggering peak time, T4) earlier than M1, the corresponding bypass switching cube M4 is turned on T4 earlier than M2.

When the intermittent start mode is used, the bypass switching transistors are turned off in a staggered manner, the time when the bypass switching transistors are turned off is relatively Td2 hours earlier than the time when the corresponding main switching transistors are turned on next time, or other times, which is not specifically limited in the present disclosure.

In summary, it can be detected whether the processor has resumed normal operation according the embodiment of the present disclosure. When the processor operates normally, the photovoltaic module group corresponding to the shutoff device is controlled to output direct current, and when the processor is still abnormal, the photovoltaic module group corresponding to the shutoff device is controlled to be entered the bypass mode.

In an embodiment, before the determining whether the power supply voltage of the processor is less than the first under-voltage protection voltage, the method further includes:

determining whether the power supply voltage of the processor is less than a second under-voltage protection voltage, where the second under-voltage protection voltage is less than the first under-voltage protection voltage;

if the power supply voltage is not less than the second under-voltage protection voltage, entering the step of determining whether the power supply voltage of the processor is less than the first under-voltage protection voltage; and if the power supply voltage is less than the second under-voltage protection voltage, controlling the processor to be powered off, controlling the processor to be powered on after receiving a power on command, and entering the step of determining whether the power supply voltage of the processor is less than the second under-voltage protection voltage.

Specifically, the first under-voltage protection voltage is only used to increase the power supply voltage of the processor, and the first under-voltage protection voltage is a voltage that will not cause the processor to power off. The processor is controlled to be powered off when the second under-voltage protection voltage is reached, and the powering-off period of the processor will be minimized after powering off, so that the processor can be powered on as soon as possible.

In addition, when the processor includes the first processor and the second processor, the first under-voltage protection voltage is a voltage that will not cause the first processor to power off, and the first processor U1 can remain energized, thereby achieving control over the whole system.

Figure 4:
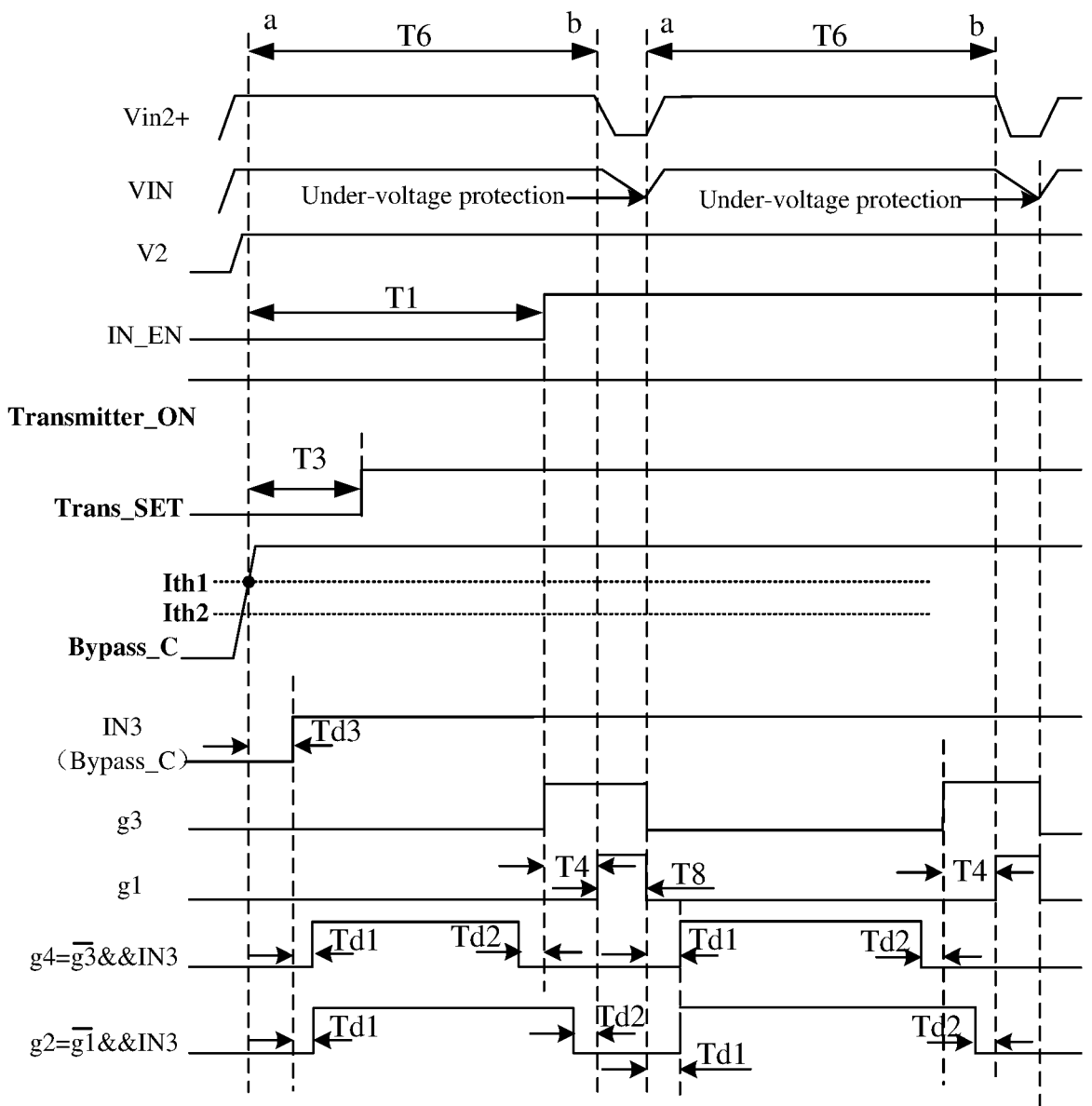
FIG. 4 is a control timing diagram of a shutoff device when a processor is not powered off according to an embodiment of the present disclosure.

Reference is made to FIG. 4, and FIG. 4 is a control timing diagram of a shutoff device when a processor is not powered off according to an embodiment of the present disclosure. By controlling the first under-voltage protection voltage to prevent the processor (specifically the first processor) from powering off and controlling the first terminal of the second capacitor C2 to supply power, the bypass operates continuously while the first processor is powered on. In order to maintain the power supply voltage VIN of the first processor, and keep the control of g1 for a period of T8 time, g1 is controlled to be in a low level to turn off M1, causing the input voltage Vin 2+ to rise, the startup process being restart and the bypass switching transistor being turned on, in which the delay period of T8 time is due to the consideration that the VIN voltage drops to the under-voltage protection voltage of the first processor U1 when M1 is turned on.

Figure 5:
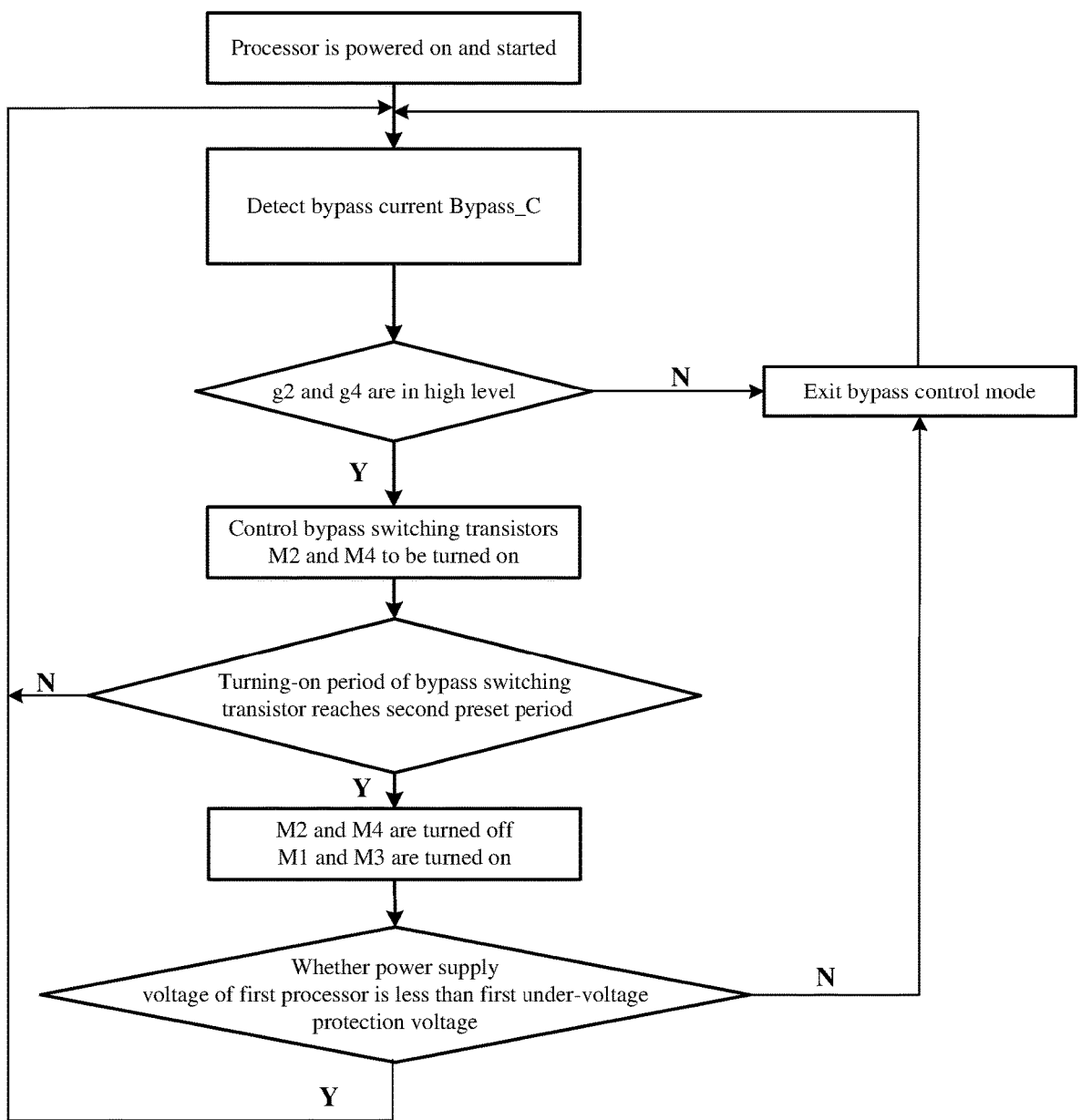
FIG. 5 is a control flowchart of a bypass switching transistor when a processor is not powered off according to an embodiment of the present disclosure.

Reference is made to FIG. 5, and FIG. 5 is a control flowchart of a bypass switching transistor when a processor is not powered off according to an embodiment of the present disclosure. The shutoff device starts after being powered on, the bypass current Bypass_C is detected, and the control signal level of the bypass switching transistor is detected. If the control signal level is low, it is controlled to exit the bypass mode, and continue to detect the bypass current. If the control signal level is high, it indicates that the bypass switching transistor is turned on at this time, and the operation of the bypass switching transistor is controlled at this time. When a setting period t7 is not reached, the above work is repeated. After the setting period t7 is reached, the bypass switching transistors M2 and M4 are turned off, and the main switching transistors M1 and M3 are turned on. If the power supply VIN of a main control chip U1 decreases to the under-voltage protection voltage, the main control chip U1 restarts the control mode, and if the power supply VIN of the main control chip U1 remains stable and does not decrease to the under-voltage protection, the bypass control mode is exited.

Figure 6:
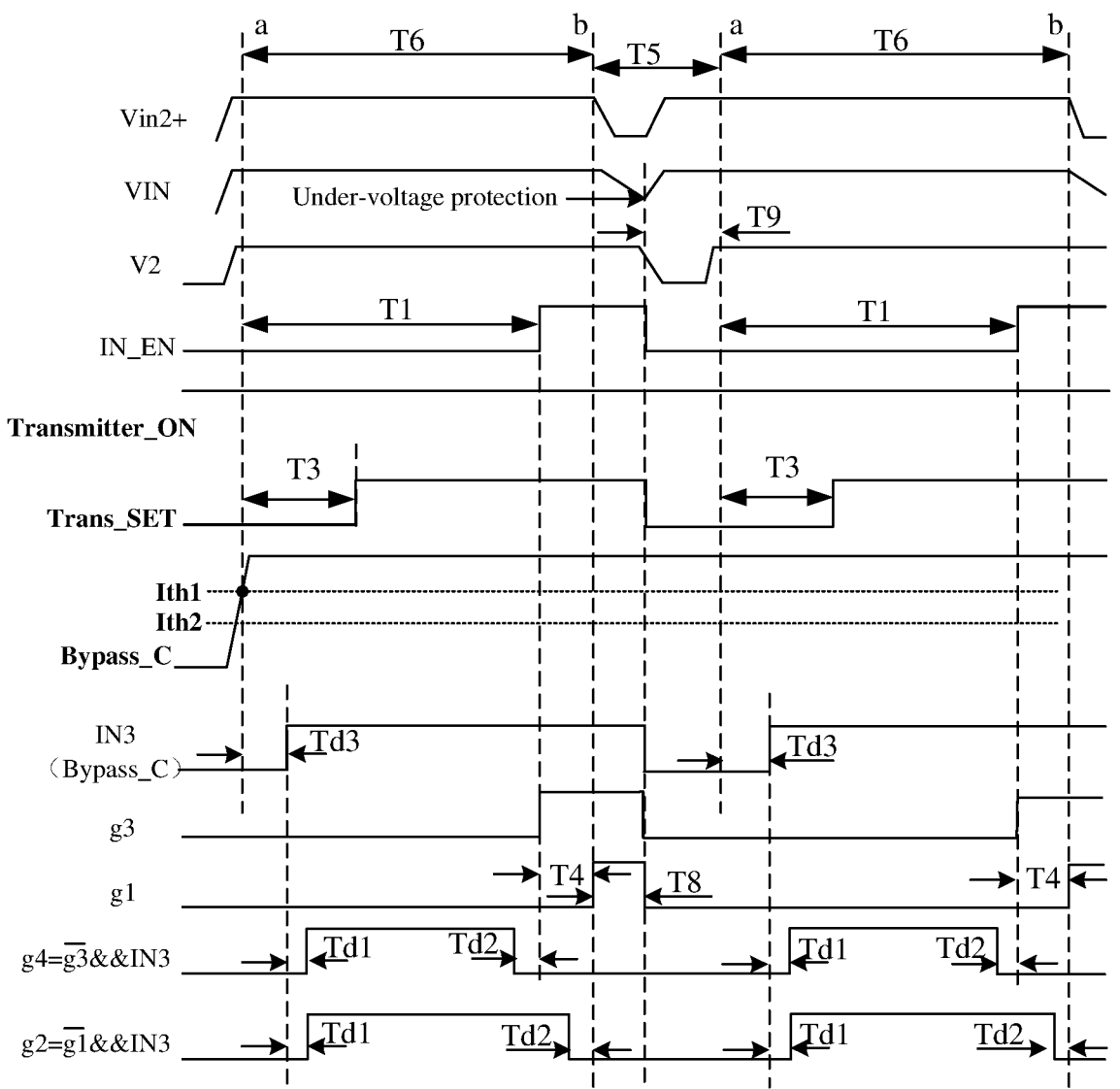
FIG. 6 is a control timing diagram of a shutoff device when a processor is powered off according to an embodiment of the present disclosure.
Figure 7:
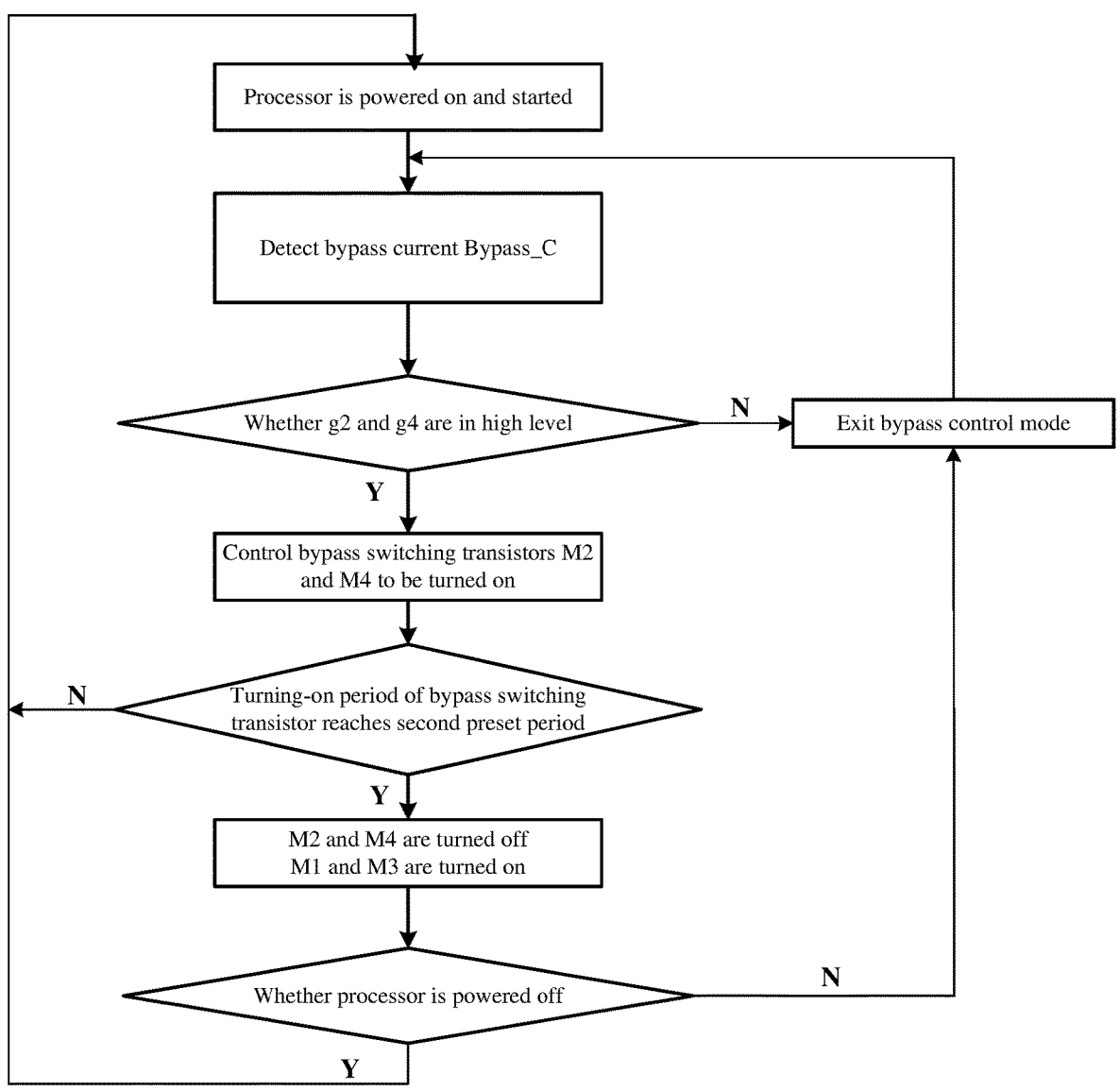
FIG. 7 is a control flowchart diagram of a bypass switching transistor when a processor is powered off according to an embodiment of the present disclosure.

Reference is made to FIG. 6, and FIG. 6 is a control timing diagram of a shutoff device when a processor is powered off according to an embodiment of the present disclosure. Reference is made to FIG. 7, and FIG. 7 is a control flowchart diagram of a bypass switching transistor when a processor is powered off according to an embodiment of the present disclosure. Overall, FIG. 6 and FIG. 7 are similar to FIG. 4 and FIG. 5, with the difference being the last step. That is, when the power supply VIN of the main control chip U1 decreases to the second under-voltage protection voltage, the first processor is powered off, and the first processor is controlled to be powered on again and the bypass controlling mode is restarted. If the power supply VIN of the main control chip U1 remains stable, the bypass controlling mode is exited.

In an embodiment, after the determining whether the power supply voltage of the processor is less than the first under-voltage protection voltage, the method further includes:

if the power supply voltage of the processor is not less than the first under-voltage protection voltage, obtaining operation information of the N photovoltaic modules;

based on the operation information, determining whether there is a photovoltaic module with abnormal operation in the N photovoltaic modules; and if there is the photovoltaic module with abnormal operation, controlling a main switching transistor corresponding to the photovoltaic module with abnormal operation to be turned off, and controlling a bypass switching transistor corresponding to the photovoltaic module with abnormal operation to be turned on.

There may be short boards such as obstructions in the photovoltaic modules corresponding to the shutoff device, which may cause abnormal voltage and current output of the module, thereby affecting the operation of the entire photovoltaic system.

In order to solve the technical problems above, in the present disclosure, when the photovoltaic module output direct current to the bus through the corresponding main switching transistor, the operation information of each photovoltaic module is obtained. Whether the corresponding photovoltaic module is abnormal is determined according to the operation information. If the corresponding photovoltaic module is abnormal, the corresponding bypass switching transistor is controlled to be turned on, to short circuit the abnormal photovoltaic module and the abnormal main switching transistor. Thus, the abnormal photovoltaic module and the abnormal main switching transistor are separated from the photovoltaic module group corresponding to the shutoff device, so that other photovoltaic modules in the photovoltaic module group can output direct current normally through the turning-on bypass switching transistor.

Specifically, obtaining the operation information of the photovoltaic module may, but is not limited to, include obtaining the output voltage and/or operating current of the photovoltaic module. The output voltage is within a preset voltage range and/or the output current is within a preset current range, it indicates that the corresponding photovoltaic module operates normally. The output voltage and/or the output current are not within the corresponding preset range, it indicates that the corresponding photovoltaic module is abnormal.

In summary, the abnormal photovoltaic module can be separated from the photovoltaic module group corresponding to the shutoff device according to the abovementioned methods, so that other photovoltaic modules in the photovoltaic module group can normally output voltage to the direct current bus, thereby ensuring the normal operation of the photovoltaic system.

In addition, it should be noted that, all the logical controls in the present disclosure can be implemented not only by software algorithms, but also through hardware forms such as AND-OR gate, which is not specially limited in the present disclosure.

Figure 8:
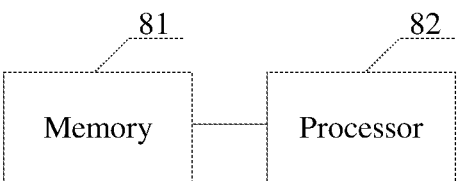
FIG. 8 is a structural diagram of an apparatus for controlling a shutoff device according to an embodiment of the present disclosure.

Reference is made to FIG. 8, FIG. 8 is a structural diagram of an apparatus for controlling a shutoff device according to an embodiment of the present disclosure. The apparatus includes:

a memory 81, configured to storage computer program; and a processor 82, configured to implement any one of the above methods for controlling the shutoff device when executes the computer program.

In order to solve the technical problems above, an apparatus for controlling the shutoff device is further provided according to the present disclosure, the introduction of the apparatus for controlling the shutoff device can refers to the above embodiments, which will not be repeated herein.

A shutoff device is further provided according to embodiment of the present disclosure. The shutoff device includes the apparatus for controlling the shutoff device described above, the N main switching transistors corresponding to the N photovoltaic modules one by one and the N bypass switching transistors corresponding to the N photovoltaic modules one by one.

A positive terminal of a power supply of the processor is connected to an output positive terminal of a first photovoltaic module, a negative terminal of the power supply of the processor is connected to an output negative terminal of an i-th photovoltaic module, a first terminal of a first main switching transistor is an output positive terminal of the shutoff device, a second terminal of an i-th main switching transistor is connected to an output positive terminal of the i-th photovoltaic module, a first terminal of an (i+1)-th main switching transistor is connected to an output negative terminal of the i-th photovoltaic module, an output negative terminal of a N-th photovoltaic module is an output negative terminal of the shutoff device, a first terminal of each bypass switching transistor is connected to a first terminal of a corresponding main switching transistor, a second terminal of said bypass switching transistor is connected to an output negative terminal of the corresponding photovoltaic module, where $N \geq i \geq 1$, and N and i are both integers.

In order to solve the technical problems above, a shutoff device is further provided according to the present disclosure, the introduction of the shutoff device provided in the present disclosure can refer to the above embodiments, which will not be repeated herein.

The above embodiments are described in a progressive manner. Each of the embodiments is mainly focused on describing its differences from other embodiments, and references may be made among these embodiments with respect to the same or similar parts. Since the apparatus disclosed in the embodiment corresponds to the method disclosed in the embodiment, the description for the apparatus is simple, and reference may be made to the method in the embodiment for the relevant parts.

It should be further noted that the relationship terminologies such as first, second or the like in the specification are only used to distinguish one entity or operation from another entity or operation, rather than to necessitate or imply an actual relationship or order of these entities or operations. Furthermore, terms "include", "comprise" or any other variants thereof are intended to be non-exclusive. Therefore, a process, method, article or apparatus including a series of elements includes not only those elements, but also other elements not expressly listed, or elements inherent to the process, method, article or apparatus. Unless expressively limited otherwise, the element defined by the statement "comprising (including) a . . . " does not exclude the case that other same elements may exist in the process, method, article or apparatus including the element.

Those skilled in the art can implement or practice the present disclosure based on the above description of the disclosed embodiments. Various modifications to the embodiments are apparent to those skilled in the art. The general principles defined in the present disclosure may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. A method for controlling a shutoff device, applied to a processor of the shutoff device, wherein the shutoff device comprises N main switching transistors corresponding to N photovoltaic modules one by one and N bypass switching transistors corresponding to the N photovoltaic modules one by one;

wherein a positive terminal of a power supply of the processor is connected to an output positive terminal of a first photovoltaic module, a negative terminal of the power supply of the processor is connected to an output negative terminal of an i-th photovoltaic module, a first terminal of a first main switching transistor is an output positive terminal of the shutoff device, a second terminal of an i-th main switching transistor is connected to an output positive terminal of the i-th photovoltaic module, a first terminal of an (i+1)-th main switching transistor is connected to an output negative terminal of the i-th photovoltaic module, an output negative terminal of a N-th photovoltaic module is an output negative terminal of the shutoff device, a first terminal of each bypass switching transistor is connected to a first terminal of a corresponding main switching transistor, a second terminal of said bypass switching transistor is connected to an output negative terminal of the corresponding photovoltaic module, wherein N≥i≥1, and N and i are both integers;

wherein the method comprises:

controlling the N main switching transistors to be turned on after receiving a heartbeat signal;

determining whether a power supply voltage of the processor is less than a first under-voltage protection voltage; and when determining that the power supply voltage of the processor is less than the first under-voltage protection voltage, controlling the N main switching transistors to be turned off, and controlling the N bypass switching transistors to be turned on.

2. The method according to claim 1, wherein before the determining whether a power supply voltage of the processor is less than a first under-voltage protection voltage, the method further comprises:

determining whether the power supply voltage of the processor is less than a second under-voltage protection voltage, the second under-voltage protection voltage being less than the first under-voltage protection voltage;

when determining that the power supply voltage is not less than the second under-voltage protection voltage, proceeding to the step of determining whether the power supply voltage of the processor is less than the first under-voltage protection voltage; and when determining that the power supply voltage is less than the second under-voltage protection voltage, controlling the processor to be powered off, controlling the processor to be powered on after receiving a power on command, and proceeding to the step of determining whether the power supply voltage of the processor is less than the second under-voltage protection voltage.

3. The method according to claim 1, wherein the bypass switching transistor is a Metal-Oxide-Semiconductor Field-Effect Transistor, MOSFET, and the MOSFET comprises a body diode;

wherein after the controlling the N main switching transistors to be turned off, the method further comprises:

obtaining a bypass current through said bypass switching transistor;

determining whether the bypass current is greater than a preset current; and when determining that the bypass current is greater than the preset current, controlling the N bypass switching transistors to be turned on.

4. The method according to claim 3, wherein the determining whether the bypass current is greater than the preset current comprises:

determining whether the bypass current is continuously greater than the preset current during a first preset period; and when determining that the bypass current is continuously greater than the preset current during the first preset period, proceeding to the step of controlling the N bypass switching transistors to be turned on.

5. The method according to claim 1, wherein after the controlling the N main switching transistors to be turned off and controlling the N bypass switching transistors to be turned on, the method further comprises:

determining whether a turning-on period of the N bypass switching transistors reaches a second preset period;

when determining that the turning-on period of the N bypass switching transistors reaches the second preset period, controlling the N bypass switching transistors to be turned off, and proceeding to the step of controlling the N main switching transistors to be turned on.

6. The method according to claim 5, wherein the controlling the N main switching transistors to be turned on comprises:

controlling the N main switching transistors to be turned on by staggering peaks; and wherein the controlling the N bypass switching transistors to be turned off comprises:

controlling an order of controlling the N bypass switching transistors to be turned off to be the same as an order of controlling the corresponding N main switching transistors to be turned on by staggering peaks.

7. The method according to claim 1, wherein after the determining whether a power supply voltage of the processor is less than a first under-voltage protection voltage, the method further comprises:

when determining that the power supply voltage of the processor is not less than the first under-voltage protection voltage, obtaining operation information of the N photovoltaic modules;

based on the operation information, determining whether there is a photovoltaic module with abnormal operation in the N photovoltaic modules; and when determining that there is the photovoltaic module with abnormal operation, controlling a main switching transistor corresponding to the photovoltaic module with abnormal operation to be turned off, and controlling a bypass switching transistor corresponding to the photovoltaic module with abnormal operation to be turned on.

8. An apparatus for controlling a shutoff device, comprising:

a memory of the apparatus, configured to store a computer program; and a processor of the apparatus, configured to implement a method for controlling the shutoff device when executes the computer program;

wherein the method for controlling the shutoff device is applied to a processor of the shutoff device;

wherein the shutoff device comprises N main switching transistors corresponding to N photovoltaic modules one by one and N bypass switching transistors corresponding to the N photovoltaic modules one by one;

wherein a positive terminal of a power supply of the processor is connected to an output positive terminal of a first photovoltaic module, a negative terminal of the power supply of the processor is connected to an output negative terminal of an i-th photovoltaic module, a first terminal of a first main switching transistor is an output positive terminal of the shutoff device, a second terminal of an i-th main switching transistor is connected to an output positive terminal of the i-th photovoltaic module, a first terminal of an (i+1)-th main switching transistor is connected to an output negative terminal of the i-th photovoltaic module, an output negative terminal of a N-th photovoltaic module is an output negative terminal of the shutoff device, a first terminal of each bypass switching transistor is connected to a first terminal of a corresponding main switching transistor, a second terminal of said bypass switching transistor is connected to an output negative terminal of the corresponding photovoltaic module, wherein N≥i≥1, and N and i are both integers; and wherein the method comprises:

controlling the N main switching transistors to be turned on after receiving a heartbeat signal;

determining whether a power supply voltage of the processor is less than a first under-voltage protection voltage; and when determining that the power supply voltage of the processor is less than the first under-voltage protection voltage, controlling the N main switching transistors to be turned off, and controlling the N bypass switching transistors to be turned on.

9. A shutoff device, comprising:

the apparatus for controlling the shutoff device according to claim 8.

10. The shutoff device according to claim 9, further comprising: a diode, a first capacitor and a second capacitor;

wherein an anode of the diode is connected to the output positive terminal of the first photovoltaic module, a cathode of the diode is connected to a first terminal of the first capacitor and the positive terminal of the power supply of the processor respectively, a second terminal of the first capacitor is connected to an output negative terminal of the first photovoltaic module and a first terminal of the second capacitor respectively, the first terminal of the second capacitor is respectively connected to the output terminal of the power supply of the processor and a terminal of a power supply of an electrical apparatus in the shutoff device; and wherein the processor is further configured to convert a voltage of the positive terminal of the power supply of the processor to supply power to the electrical apparatus in the shutoff device.

\* \* \* \* \*